UNITED STATES PATENT OFFICE.

CHARLES J. EAMES, OF NEW YORK, N. Y., ASSIGNOR TO THE CARBON IRON COMPANY, OF SAME PLACE.

PROCESS OF MAKING WROUGHT-IRON DIRECT FROM IRON ORES.

SPECIFICATION forming part of Letters Patent No. 318,551, dated May 26, 1885.

Application filed September 27, 1884. (Specimens.)

*To all whom it may concern:*

Be it known that I, CHARLES J. EAMES, of the city, county, and State of New York, have invented a new and useful Improvement in Processes of Making Wrought-Iron Direct from Iron Ores; and I hereby declare that the following is a full, clear, and exact description of the same.

My process relates to the making of wrought-iron direct from iron ores.

My process consists in melting said iron ores, with or without a fusible slag, in a furnace having a friable sole or hearth composed of a mixture of plumbago, pulverized fire-brick, coal-tar, or molasses, or their equivalents, such as wood-tar, still residuum, or other carbonaceous adhesive binding material. The iron ores, when melted, being in contact with said sole or hearth, give up their oxygen to the carbon of the plumbago, forming carbonic oxide, and reducing the iron contained in the ore to its metallic state. It is then removed from the furnace and hammered into any desired shape.

I have found, when reducing magnetic iron ore or magnetite, that the decomposition is greatly facilitated after the ore is melted by rapidly increasing the heat of the furnace, causing the gases to combine with greater energy, and also that the presence of finely-divided particles of plumbago necessarily permeating the molten mass converts the silica of the ore into silicon, which is afterward removed by a subsequent heating before taking the spongy iron from the furnace.

I have found in practice that any ordinary reverberating furnace can be used when the sole or hearth has been lined with a mixture of about the following proportions: sixty parts plumbago and forty parts pulverized fire-brick or ordinary fire-clay which has been calcined and pulverized, the whole moistened with coal-tar or molasses, or their equivalents, to the consistency of a thick paste, and when this hearth is thoroughly dried the charges of iron ore in lumps as it comes from the mine may be mixed with about twenty-five per cent. of any fusible iron slag. Ordinarily the slag from a previous charge is used. This charge is placed in the furnace, and when melted the heat is increased to promote the rapid decomposition of the ore. The fusible slag remaining on top of the charge in a molten condition protects the converted iron from reoxidation. A sample of the melted charge is removed from the furnace and cooled, and if free from iron the slag is drawn from the furnace and the newly-made iron sponge taken from the furnace and hammered into blooms of any desired size, and the operation continued.

I am aware that carbon in various forms has been mingled with the charge of ore for the purpose of producing malleable iron direct; that graphite has been used in solid mass in the form of crucibles and slabs for furnace-linings, and also in the form of plumbago in conjunction with bauxite for the formation of more or less refractory bricks for lining furnaces used in the reduction of ore, and do not herein claim such subject-matter, for the reason that where graphite or plumbago has heretofore been used intermingled with the charge it has been in a powdered state, which permitted it to be drifted by the blasts in the furnace and rendered results uncertain, and where used as a furnace-lining or containing vessel it has been in a compact mass, which did not readily yield to the ore, and required fusion of the metal to become active. The essence of my invention resides in the friable hearth, which readily yields its carbon to the ore or spongy metal.

I do not herein claim a process for the manufacture of sponge and wrought iron wherein the ore in its natural state is treated on a friable graphitic bed while covered by a layer of graphitic lumps, as the same forms the subject-matter of an application filed December 6, 1884, Serial No. 149,684; nor do I herein claim a similar process wherein lumps of graphitic carbon are intermingled with the ore to be treated, as the same forms the subject-matter of an application filed December 6, 1884, Serial No. 149,683.

Having now fully described my process, what I claim as my invention, and desire to secure by Letters Patent, is—

The process, substantially as hereinbefore specified, for the production of wrought-iron direct from the ore, which consists in reducing the ore upon a friable graphitic hearth, composed of plumbago, pulverized fire-brick, and a carbonaceous adhesive binder, whereon the ore is subjected to a suitable temperature, and finally balling and blooming the sponge thus formed, substantially as and for the purposes specified.

In testimony whereof I affix my signature, in presence of two witnesses, this 25th day of September, 1884.

CHARLES J. EAMES.

Witnesses:
 WILLIAM BRANDRETH,
 C. H. CUMMING.